US012652652B2

(12) United States Patent
Liu et al.

(10) Patent No.: US 12,652,652 B2
(45) Date of Patent: Jun. 9, 2026

(54) MULTIMODE CHIP AND TERMINAL DEVICE

(71) Applicant: Spreadtrum Communications (Shanghai) Co., Ltd., Shanghai (CN)

(72) Inventors: Feng Liu, Shanghai (CN); Jing Wang, Shanghai (CN); Ning He, Shanghai (CN); Hongyu Zhang, Shanghai (CN); Shanhu Gao, Shanghai (CN); Kai Zhang, Shanghai (CN); Yin Yang, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 527 days.

(21) Appl. No.: 18/041,398

(22) PCT Filed: Aug. 9, 2021

(86) PCT No.: PCT/CN2021/111565
§ 371 (c)(1),
(2) Date: Feb. 10, 2023

(87) PCT Pub. No.: WO2022/033437
PCT Pub. Date: Feb. 17, 2022

(65) Prior Publication Data
US 2023/0180194 A1 Jun. 8, 2023

(30) Foreign Application Priority Data
Aug. 10, 2020 (CN) .......................... 202010797264.X

(51) Int. Cl.
*H04W 72/04* (2023.01)
*G06F 9/50* (2006.01)
*H04W 88/06* (2009.01)

(52) U.S. Cl.
CPC .......... *H04W 72/04* (2013.01); *G06F 9/5044* (2013.01); *H04W 88/06* (2013.01)

(58) Field of Classification Search
CPC ..... H04W 72/04; H04W 88/06; G06F 9/5044; G06F 2209/5021; G06F 9/5027; G06F 9/4843; G06F 9/5005; Y02D 10/00
See application file for complete search history.

(56) References Cited

U.S. PATENT DOCUMENTS 10,362,166 B2 * 7/2019 Tran ..................... H04L 65/1069
10,768,920 B2 * 9/2020 Fontoura ................... G06F 8/65
(Continued)

FOREIGN PATENT DOCUMENTS

CN 102123500 A 7/2011
CN 103167610 A 6/2013
(Continued)

OTHER PUBLICATIONS

International Search Report for PCT application No. PCT/CN2021/111565 filed on Aug. 9, 2021 and ISR completed on Oct. 27, 2023.
(Continued)

*Primary Examiner* — Qun Shen
(74) *Attorney, Agent, or Firm* — Quarles & Brady LLP

(57) ABSTRACT

An embodiment of the present disclosure provides a multimode chip including a resource allocation circuit and at least two control circuits, where each control circuit corresponds to a communication mode; the control circuit acquires a task scheduling instruction corresponding to a first task, and send to the resource allocation circuit, according to the task scheduling instruction, a processor resource application request corresponding to the first task, where the first task is a task to be executed by the control circuit; the resource allocation circuit determines, according to the processor resource application request, a processor resource applica-
(Continued)

Base station

101

102

Terminal device tion result corresponding to the first task, and send the processor resource application result to the control circuit, where the processor resource application result indicates a successful application or a failed application; and the control circuit is further configured to process the first task according to the processor resource application result.

16 Claims, 4 Drawing Sheets

(56) References Cited

U.S. PATENT DOCUMENTS

| | | | | |
|---|---|---|---|---|
| 10,939,430 B2 * | 3/2021 | Li | | H04W 12/08 |
| 11,188,376 B1 * | 11/2021 | Alexander | | G06F 9/45558 |
| 2012/0135715 A1 * | 5/2012 | Kang | | H04W 4/16 |
| | | | | 455/418 |
| 2016/0366270 A1 * | 12/2016 | He | | H04L 63/0853 |
| 2017/0353939 A1 * | 12/2017 | Behera | | H04W 76/18 |
| 2019/0012210 A1 * | 1/2019 | Chen | | G06F 9/5011 |
| 2019/0258635 A1 * | 8/2019 | Pal | | G06F 16/2272 |
| 2019/0281370 A1 * | 9/2019 | Struhsaker | | H04W 4/80 |
| 2019/0370062 A1 | 12/2019 | Leyrer et al. | | |
| 2020/0257968 A1 * | 8/2020 | Mitra | | G06N 3/006 |
| 2020/0411170 A1 * | 12/2020 | Brown | | G06N 20/00 |
| 2022/0124622 A1 * | 4/2022 | Islam | | H04W 72/20 |

FOREIGN PATENT DOCUMENTS

| | | | |
|---|---|---|---|
| CN | 103368622 A | 10/2013 | |
| CN | 105916208 A | 8/2016 | |
| CN | 108668331 A | 10/2018 | |
| CN | 110398921 A | 11/2019 | |
| CN | 111897645 A | 11/2020 | |

OTHER PUBLICATIONS

Second Office Action issued for CN application No. 202010797264.X issued on Nov. 2, 2022.
First Office Action issued for CN application No. 202010797264.X issued on May 26, 2022.
Decision of Rejection issued for CN application No. 202010797264.X issued on Jan. 9, 2023.

* cited by examiner

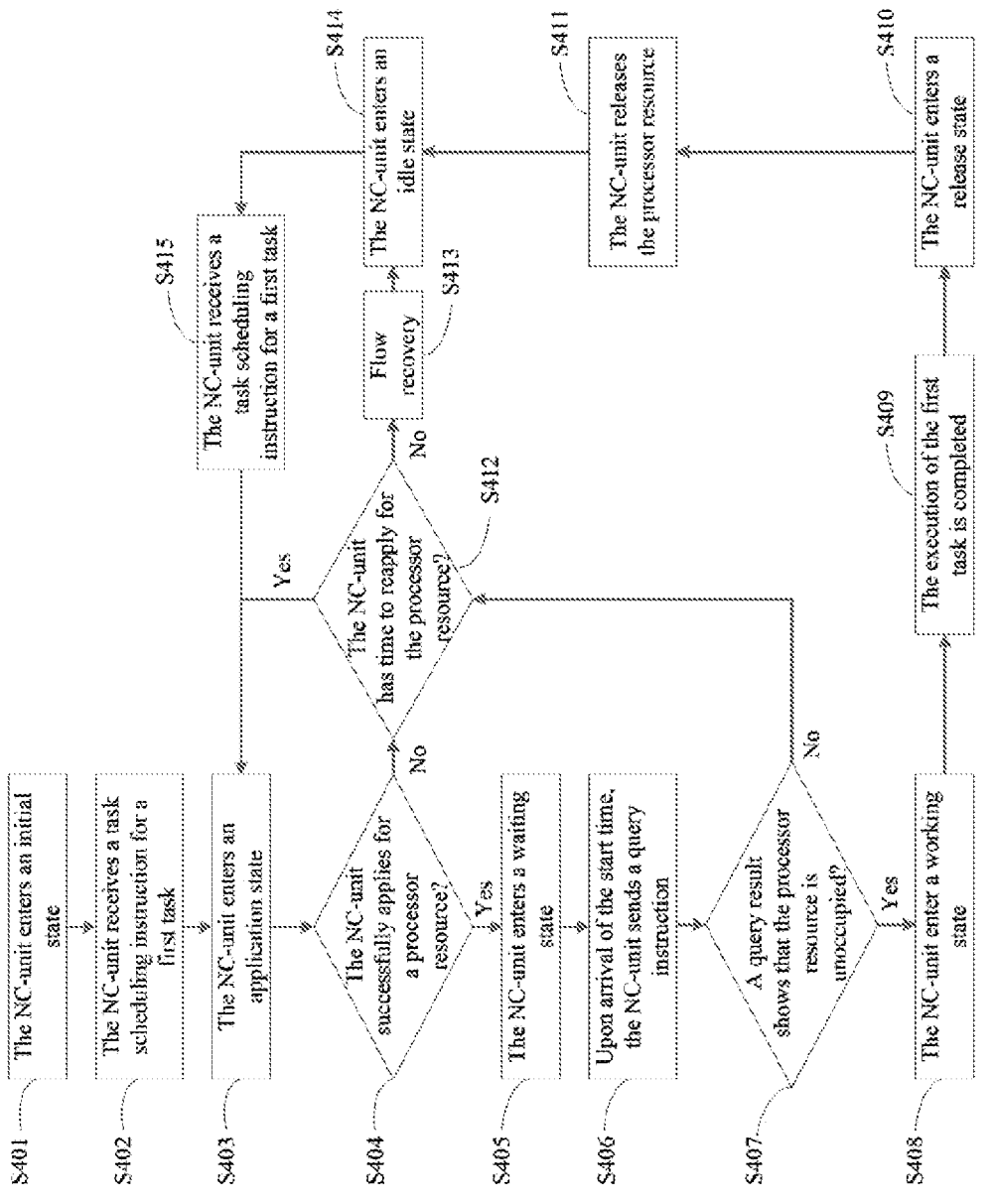

FIG. 4

S401 — The NC-unit enters an initial state

S402 — The NC-unit receives a task scheduling instruction for a first task

S403 — The NC-unit enters an application state

S404 — The NC-unit successfully applies for a processor resource?

S405 — The NC-unit enters a waiting state

S406 — Upon arrival of the start time, the NC-unit sends a query instruction

S407 — A query result shows that the processor resource is unoccupied?

S408 — The NC-unit enter a working state

S409 — The execution of the first task is completed

S410 — The NC-unit enters a release state

S411 — The NC-unit releases the processor resource

S412 — The NC-unit has time to reapply for the processor resource?

S413 — Flow recovery

S414 — The NC-unit enters an idle state

S415 — The NC-unit receives a task scheduling instruction for a first task

Yes

No

No

Yes

No

MULTIMODE CHIP AND TERMINAL DEVICE

CROSS-REFERENCE TO RELATED APPLICATION

This application is a national stage of International Application No. PCT/CN2021/111565, field on Aug. 9, 2021, which claims priority to Chinese Patent Application No. 202010797264.X, filed to China National Intellectual Property Administration on Aug. 10, 2020 and entitled "Multimode Chip and Terminal Device". Both of the aforementioned applications are hereby incorporated by reference in their entireties.

TECHNICAL FIELD

Embodiments of the present disclosure relate to the field of communication technologies, and in particular, to a multimode chip and a terminal device.

BACKGROUND

Narrow band Internet of Things (NB-IoT) is a new technology in the field of Internet of Things, which can support the long-term use of a terminal device with extremely low power consumption. However, since base station planning for the network NB-IoT has not yet reached full coverage, and the technical protocol standards do not support traditional voice services, a multimode terminal which contains other wide coverage communication modes supporting voice communication is required to meet demands.

In a current multimode terminal implementation, multiple standalone single-mode chips are mainly used to enable multi-chip flow coordination and mode switching at a module level.

SUMMARY

Embodiments of the present disclosure provide a multimode chip and a terminal device.

In a first aspect, an embodiment of the present disclosure provides a multimode chip including a resource allocation circuit and at least two control circuits, where each control circuit corresponds to a communication mode; where, the control circuit is configured to acquire a task scheduling instruction corresponding to a first task, and send to the resource allocation circuit, according to the task scheduling instruction, a processor resource application request corresponding to the first task, where the first task is a task to be executed by the control circuit;

the resource allocation circuit is configured to determine, according to the processor resource application request, a processor resource application result corresponding to the first task, and send the processor resource application result to the control circuit, where the processor resource application result indicates a successful application or a failed application; and the control circuit is further configured to process the first task according to the processor resource application result.

In a second aspect, an embodiment of the present disclosure provides a terminal device, including the multimode chip according to the first aspect.

BRIEF DESCRIPTION OF DRAWINGS

In order to illustrate the technical solution in the embodiments of the present disclosure more clearly, the accompanying drawings used in the description of the embodiments will be briefly described hereunder. Obviously, the drawings in the following description are some embodiments of present disclosure. For persons of ordinarily skill in the art, other drawings may be obtained based on these drawings without paying any creative effort.

FIG. 4 is a schematic diagram of flow scheduling of a multimode chip according to an embodiment of the present disclosure.

DESCRIPTION OF EMBODIMENTS

In order to describe objections, technical solutions, and advantages of embodiments of the present disclosure more clearly, the technical solutions in the embodiments of the present disclosure will be described hereunder clearly and comprehensively with reference to the accompanying drawings in the embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative effort shall fall into the protection scope of the present disclosure.

First, concepts involved in the present disclosure will be explained.

Narrow band Internet of Things (NB-IoT) is a new technology in the field of Internet of Things, which supports cellular data connection of low-power devices in a wide area network and can support the long-term use of a terminal product with extremely low power consumption. However, since the planning number of base stations for the network NB-IoT has not yet reached full coverage, and the technical protocol standards do not support traditional voice services, a current multimode terminal device contains other wide coverage communication modes supporting voice communication. NB-IoT and GSM dual-mode chips are product forms realized in the present disclosure.

The Global System for Mobile Communications (GSM) is a widely used mobile communication technology.

In a current multimode terminal implementation, multiple standalone single-mode chips are mainly used to enable multi-chip flow coordination and mode switching at a module level. However, the arrangement of multiple single-mode chips leads to large module size, high cost and power consumption due to low integration. In order to solve the above problem, a possible solution is to integrate the NB-IoT with other modes on a single chip, which can be realized through a multimode chip.

However, since the multimode chip supports multiple communication modes, conflicts may occur in processor resources under the multimode. At present, there is no scheduling and conflict solution for processor resources under a multimode chip.

Figure 1:
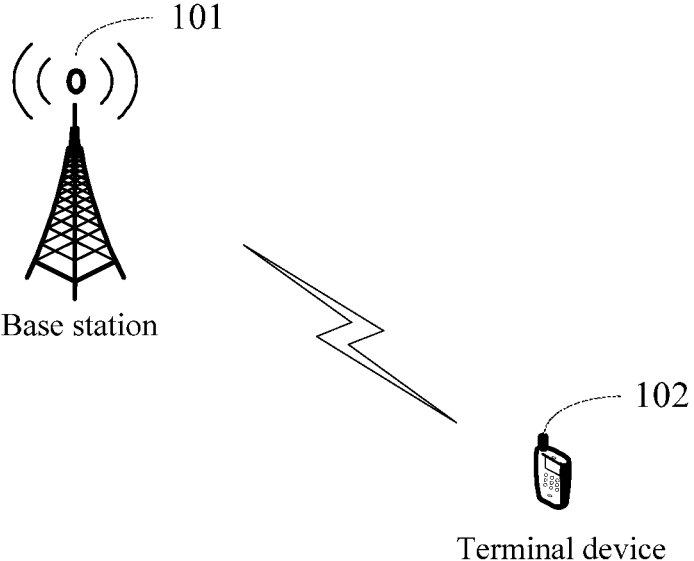
FIG. 1 is a schematic diagram of an application scenario according to an embodiment of the present disclosure.

FIG. 1 is a schematic diagram of an application scenario according to an embodiment of the present disclosure. As shown in FIG. 1, a base station 101 and a terminal device

102 are included, and wireless communication can be performed between the base station 101 and the terminal device 102.

When the wireless communication is performed between the base station 101 and the terminal device 102, multiple communication modes can be supported, including for example, an NB-IoT communication mode, a GSM communication mode, and the like, at this point, the terminal device 102 is a multimode terminal.

For the multimode terminal, there may be two implementations in the terminal device 102. One implementation is to set multiple single-mode chips in the terminal device 102, where each single-mode chip supports one communication mode. For example, one single-mode chip can be set to support the NB-IoT communication mode, and one single-mode chip can be set to support the GSM communication mode, and so on.

If multiple single-mode chips are set, the terminal device 102 performs multi-chip flow coordination and mode switching at a module level. However, such method has low integration, resulting in large module size, high cost and power consumption.

Another implementation is to set a multimode chip in the terminal device 102, where the multimode chip supports multiple communication modes, for example, supporting the NB-IoT communication mode and the GSM communication mode.

By integrating multiple communication modes on a multimode chip, the module cost can be reduced, and the difficulty and speed of module development can be reduced. Furthermore, in addition to NB-IoT and GSM baseband signal processing units that must be independent due to different communication protocols, NB-IoT and GSM scheduling processes can be implemented on a single shared processor resource, thereby further reducing the chip size, the power consumption and the costs.

However, if multiple communication modes are integrated on the same chip, conflicts may occur for execution of tasks under such communication modes. Based on this, an embodiment of the present disclosure provides a scheme to achieve effective scheduling and conflict resolution for shared processor resources in multimode flows.

The network architecture and business scenario described in the embodiments of the present disclosure are intended to more clearly describe the technical solutions in the embodiments of the present disclosure, but do not constitute a limitation to the technical solutions provided in the embodiments of the present disclosure. As known by persons of ordinary skill in the art, with the evolution of the network architecture and the emergence of a new business scenario, the technical solutions provided in the embodiments of the present disclosure are applicable to a similar technical problem.

Figure 2:
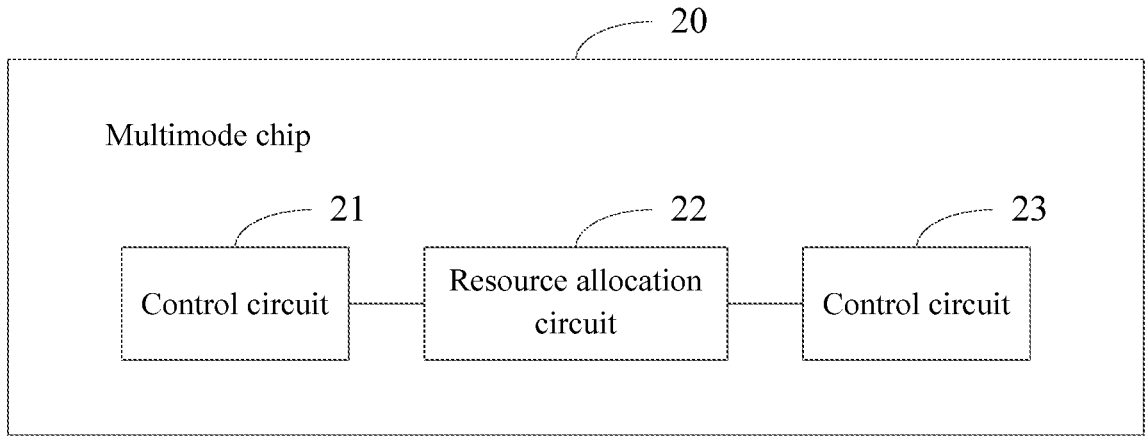
FIG. 2 is a schematic structural diagram of a multimode chip according to an embodiment of the present disclosure.

FIG. 2 is a schematic structural diagram of a multimode chip according to an embodiment of the present disclosure. As shown in FIG. 2, the multimode chip 20 includes a resource allocation circuit 22 and at least two control circuits, where each control circuit corresponds to a communication mode. An example is taken in FIG. 2, where the control circuits include a control circuit 21 and a control circuit 23.

The control circuit is configured to acquire a task scheduling instruction corresponding to a first task, and send to the resource allocation circuit 22, according to the task scheduling instruction, a processor resource application request corresponding to the first task, where the first task is a task to be executed by the control circuit.

The resource allocation circuit 22 is configured to determine, according to the processor resource application request, a processor resource application result corresponding to the first task, and send the processor resource application result to the control circuit, where the processor resource application result indicates a successful application or a failed application.

The control circuit is further configured to process the first task according to the processor resource application result.

For any one of the control circuits, the first task is a task to be executed by the control circuit. The control circuit supports a communication mode, which, for example, may be the NB-IoT mode.

When the multimode chip 20 is installed in a certain electronic device, such as a terminal device, the first task may be a task initiated by the terminal device, or a task initiated by an apparatus communicating with the terminal device. For example, when the terminal device communicates with a base station, the first task also may be a task initiated by the base station and to be executed by the terminal device.

When the control circuit needs to perform the first task, it needs to occupy a processor resource on the multimode chip first. Before that, therefore, it is necessary to apply for the processor resource first. At this point, the control circuit first acquires a task scheduling instruction, and then sends a processor resource application request to the resource allocation circuit 22 according to the task scheduling instruction.

After receiving the processor resource application request, the resource allocation circuit 22 determines a processor resource application result. The processor resource application result may indicate a success or may indicate a failure. If the application is successful, it means that the processor resource is unoccupied, and the control circuit can subsequently process the first task based on the applied processor resource. If the application is failed, it means that the processor resource is occupied, and the control circuit may not be able to occupy the processor resource, so that the execution of the first task needs to be terminated. Therefore, the control circuit can process the first task according to the processor resource application result as long as it obtains the processor resource application result subsequently.

An embodiment of the present disclosure provides a multimode chip. The multimode chip includes a resource allocation circuit and at least two control circuits, where each control circuit supports a communication mode accordingly. For any one of the control circuits, the control circuit is configured to acquire a task scheduling instruction corresponding to a first task, and send to the resource allocation circuit, according to the task scheduling instruction, a processor resource application request corresponding to the first task, where the first task is a task to be executed by the control circuit. After receiving the processor resource application request, the resource allocation circuit is configured to determine, according to the processor resource application request, a processor resource application result corresponding to the first task, and send the processor resource application result to the control circuit, where the processor resource application result indicates a successful application or a failed application. After receiving the processor resource application result, the control circuit processes the first task according to the processor resource application result. According to the scheme provided in the embodiments of the present disclosure, for a multimode chip supporting multiple communication modes, before execution of a task, a processor resource is applied from the resource allocation circuit firstly, and the task is processed according to an application result, thereby achieving resource scheduling under each control circuit.

The scheme of the present disclosure will be described hereunder in detail with specific embodiments.

Figure 3:
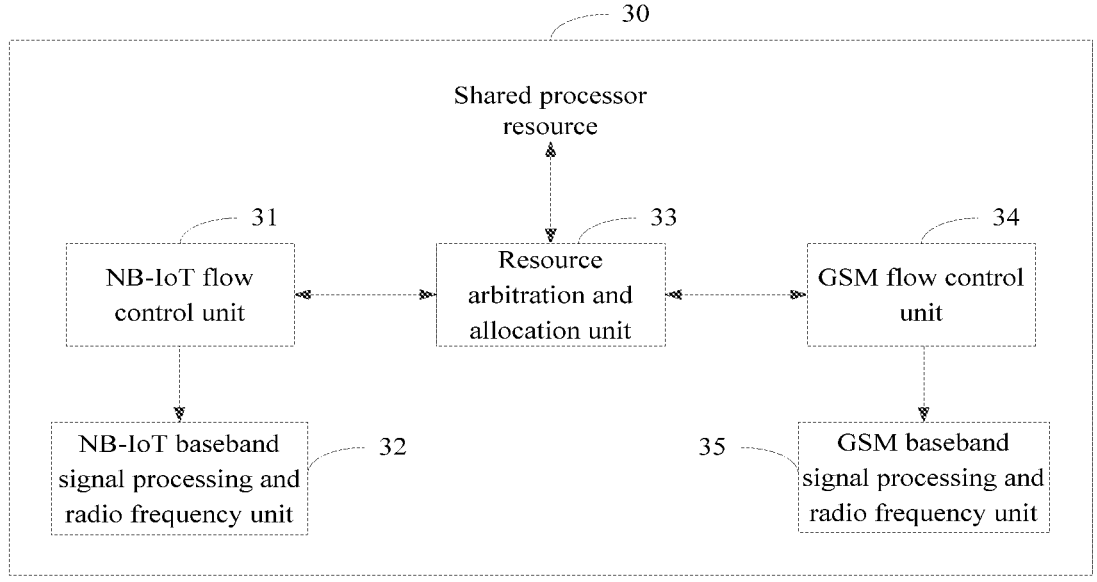
FIG. 3 is a schematic block diagram of a dual-mode terminal chip according to an embodiment of the present disclosure.

FIG. 3 is a schematic block diagram of a dual-mode terminal chip according to an embodiment of the present disclosure. As shown in FIG. 3, the dual-mode terminal chip 30 supports two communication modes, which are respectively the NB-IoT communication mode and the GSM communication mode.

The dual-mode terminal chip 30 includes an NB-IoT flow control unit 31, an NB-IoT baseband signal processing and radio frequency unit 32, a resource arbitration and allocation unit 33, a GSM flow control unit 34, and a GSM baseband signal processing and radio frequency unit 35. Among them, the NB-IoT flow control unit 31 and the NB-IoT baseband signal processing and radio frequency unit 32 constitute a control circuit under the NB-IoT communication mode, the GSM flow control unit 34 and the GSM baseband signal processing and radio frequency unit 35 constitute a control circuit under the GSM communication mode, and the resource arbitration and allocation unit 33 corresponds to a resource allocation circuit.

The NB-IoT flow control unit 31 is configured to control the execution of a task flow under the NB-IoT communication mode. When a corresponding task needs to be executed under the NB-IoT communication mode, the NB-IoT flow control unit 31 can apply occupation of a processor resource from the resource arbitration and allocation unit 33. After a successful application, the NB-IoT flow control unit 31 can control the NB-IoT baseband signal processing and radio frequency unit 32 to carry out execution.

Similarly, the GSM flow control unit 34 is configured to control the execution of a task flow under the GSM communication mode. When a corresponding task needs to be executed under the GSM communication mode, the GSM flow control unit 34 can apply occupation of a processor resource from the resource arbitration and allocation unit 33. After a successful application, the GSM flow control unit 34 can control the GSM baseband signal processing and radio frequency unit 35 to carry out execution.

In the following embodiments, description is made by using task flow scheduling and allocation under merely the NB-IoT communication mode as an example.

In an embodiment of the present disclosure, the NB-IoT flow control unit (NC-unit) initiates basic operations such as application, query and release of a shared processor resource to the resource arbitration and allocation unit (ARB-unit). The operations are described in detail as follows.

Application: initiate a processor resource application request in advance according to a flow scheduling task, exclusively occupy a shared processor resource in a specific period of time in the future, and declare to the ARB-unit a task category and a start time and an end time of the scheduling, where the time is measured in ms. The processor resource application result indicates a successful application or a failed application.

After acquiring the task scheduling instruction corresponding to the first task, the control circuit first determines a first duration and a start time for executing the first task, where the start time is a time starting from execution of the first task after a successful processor resource application, and the first duration is an estimated time required for executing the first task. When performing the processor resource application, the first duration is also a duration in which the applied processor resource is occupied. Generally, the actual duration required to execute the first task is less than or equal to a first duration.

After the first duration and the start time are determined, a processor resource application is possible. In an embodiment of the present disclosure, a pre-application scheme can be carried out, that is, sending the processor resource application request to the resource allocation circuit at a first time, where the first time is earlier than the start time for executing the first task, thereby achieving the pre-application. The processor resource application request also includes the first duration. After acquiring the processor resource application request, the resource allocation circuit can know the first duration in which the applied processor resource is occupied.

When the processor resource application result indicates a successful application, the first task can be processed according to the processor resource. Specifically, since the pre-application is implemented, the start time has not yet arrived in case of a successful application. Therefore, at this point, the control circuit can be set to be in a waiting state. Before the arrival of the start time, a state of the processor resource is acquired, and the first task is processed according to the state of the processor resource, where the state of the processor resource is an occupied state or an unoccupied state. The occupied state indicates that another task is occupying the processor resource at this point. The unoccupied state indicates that the processor resource has not been occupied at this point. A query procedure is required when acquiring the state of the processor resource.

Query: for a successful application of the processor resource application, before the start of a specific period from the application, reconfirm the validity of a period to the ARB-unit so as to avoid a conflict caused by the processor resource being preempted by a high priority task.

After a successful processor resource application, the control circuit sends, before the start time, a query instruction to the resource allocation circuit, where the query instruction is used to query the state of the processor resource. After acquiring the state of the processor resource, the resource allocation circuit sends the state of the processor resource to the control circuit, so that the control circuit can acquire the state of the processor resource and process the first task according to the state of the processor resource.

Since there are two states for the processor resource, that is, an occupied state or an unoccupied state, there are different processing methods for different states of the processor resource.

When the state of the processor resource is the unoccupied state, the control circuit can occupy the processor resource and execute the first task according to the processor resource.

When the state of the processor resource is the occupied state, assuming that the task currently occupying the processor resource is a second task, corresponding processing needs to be further performed according to priority of the first task and priority of the second task.

Specifically, when the priority of the first task is higher than the priority of the second task, the execution of the second task is stopped at this point. And the control circuit occupies the processor resource and executes the first task according to the processor resource. Otherwise, the processor resource would still be occupied by the second task, and it is determined whether there is enough time to reapply a processor resource for the first task at this point. If yes, proceed with the reapplication. Otherwise, the execution of the first task will be ended.

For example, when it is determined that the priority of the first task is not higher than the priority of the second task, a third duration between the current time and the start time is acquired, and the first task is processed according to the third duration.

When the third duration indicates that the current time is earlier than the start time, and the third duration is greater than or equal to a preset duration, it means that there is still enough time before the start time and thus the processor resource can be reapplied. At this point, the control circuit can re-send the processor resource application request to the resource allocation circuit. After receiving the processor resource application request re-sent by the control circuit, the resource allocation circuit will send a processor resource application result to the control circuit, and in turn the control circuit will process the first task according to the processor resource application result. The subsequent processing procedure is similar to the processing method for a case where the processor resource application result is received for the first time, and details will not be described here again.

It should be noted that the priority of the first task and the priority of the second task are determined by the resource allocation circuit.

In an implementation, if the processor resource application result indicates a failed application, it can also be determined whether there is enough time to reapply a processor resource for the first task at this point. If yes, proceed with the reapplication; otherwise, the first task can be ended.

For example, similarly, when the processor resource application result indicates a failed application, a second duration between the current time and the start time can be acquired and the first task can be processed according to the second duration.

When the second duration indicates that the current time is earlier than the start time, and the second duration is greater than or equal to the preset duration, it means that there is currently enough time to reapply for the processor resource. The control circuit can re-send the processor resource application request to the resource allocation circuit, and process the first task according to a processor resource application result. If the current time is not earlier than the start time, or the second duration is less than the preset duration, it means that there is currently not enough time to reapply for the processor resource, and the execution of the first task is ended at this point.

In an implementation, before ending the first task, the control circuit sends a response signal to the resource allocation circuit, where the response signal is used to indicate unoccupancy of the processor resource by the first task.

Release: after the flow scheduling task is completed, initiatively declare to the ARB-unit to discard a remaining allocated period of time.

When the control circuit is applying for the processor resource for the first task, a duration in which the applied processor resource is occupied is the first duration. When the first task is actually processed, the duration required may be shorter than the first duration. Therefore, the processor resource can be released in time after the execution of the first task, so as to avoid a waste of resource. If the time spent in processing the first task is the first duration, the processor resource also needs to be released after the execution of the first task.

FIG. 4 is a schematic diagram of flow scheduling of a multimode chip according to an embodiment of the present disclosure. As shown in FIG. 4, the following are included.

At S401, the NC-unit enters an initial state.

At S402, the NC-unit receives a task scheduling instruction for a first task.

At S403, the NC-unit enters an application state.

When receiving the task scheduled by the system, the NC-unit needs to calculate, according to the communication protocol, an exact start timestamp (that is, the start time) and length (that is, the first duration) for task scheduling of the first task, immediately initiate an application operation to the ARB-unit, and wait to re-initiate an application operation if there is a failed application.

Here, a pre-application mechanism is used, instead of making an application before the start of the first task. Therefore, the success rate of a resource application and an NB-IoT service can be effectively increased.

At S404, determine whether the NC-unit successfully applies for a processor resource. If yes, proceed with execution of S405; if no, proceed with execution of S412.

At S405, the NC-unit enters a waiting state.

At S406, upon arrival of the start time, the NC-unit sends a query instruction.

The query instruction is used to query whether the pre-applied processor resource is occupied. By sending the query instruction to the ARB-unit and receiving a query result from the ARB-unit, the NC-unit can know whether the processor resource is occupied.

At S407, determine whether the query result is that the processor resource is unoccupied. If yes, proceed with execution of S408; if no, proceed with execution of S412.

When there is a successful processor resource application, the NC-unit may enter a corresponding power-saving mode according to a delay from the start time of the first task, wake up before the start of the first task, and initiate a query operation to determine whether the reserved processor resource is still valid. If the processor resource is valid, the first task that was previously scheduled is performed. If the processor resource is preempted by a high priority task, reapplication is selected according to the remaining time.

The use of a query mechanism can allow a high priority task to acquire a shared processor resource from an assigned low priority task, thereby improving the processing efficiency in a dual mode.

At S408, the NC-unit enter a working state.

The working state of the NC-unit refers to a state in which a processor resource is occupied to execute a corresponding task.

At S409, the execution of the first task is completed.

After entering the working state, the NC-unit can occupy the processor resource to execute the first task.

At S410, the NC-unit enters a release state.

At S411, the NC-unit releases the processor resource to proceed with execution of S414.

When the first task is completed, the NC-unit initiates a release operation. If, at this point, the end time of the resource applied for the first task has not reached, the resource will also be released in advance for use in the GSM mode. The use of a release mechanism can effectively improve the utilization of a shared processor resource.

At S412, determine whether the NC-unit has time to reapply for the processor resource. If yes, proceed with execution of S403; if no, proceed with execution of S413.

Under the situation that there is time to reapply for the processor resource and there can be a successful application, the first task may be executed subsequently. If there is no time to reapply for the processor resource or there is a failed reapplication, the execution of the first task will be stopped.

That is, at this point, a duration between the current time and the start time can be acquired and compared with a preset duration. If the current time is earlier than the start time, and a duration difference between the two is greater than or equal to the preset duration, it indicates that there is currently enough time to reapply for the processor resource. Based on this, the processor resource can be reapplied and corresponding processing can be performed according to a reapplication result. Otherwise, it means that there is not enough time to reapply for the processor resource and the execution of the first task needs to be ended.

To be noted, if the processor resource is occupied by a second task at this point and priority of the first task is higher than priority of the second task, then the first task can forcibly occupy the processor resource at this point, and the execution of the second task is stopped. This also means that the processor resource is unoccupied. If the priority of the first task is not higher than the priority of the second task, it is deemed that the processor resource is occupied, and corresponding processing is performed according to the scheme in S412.

The priority of the first task and the priority of the second task are determined by the ARB-unit (equivalent to the resource allocation circuit in the multimode chip).

At S413, come to a flow recovery.

In the above scenario where resource conflicts cause multiple failed applications, or there is a successful application but the query is failed before the start of the task and there is not enough time to reapply, the NC-unit will discard the task and enter a flow recovery; a corresponding response signal will be generated to notify the NB-IoT protocol stack, so that the system flow can be protected from unrecoverable errors due to damage from the resource conflicts. For different NB-IoT service flows (such as cell search, measurement, random access, uplink and downlink transmission in a connected state), corresponding flow recovery mechanisms are designed.

At S414, the NC-unit enters an idle state.

The idle state refers to a state in which the NC-unit has not applied for processor resource scheduling.

At S415, the NC-unit receives a task scheduling instruction for a first task to proceed with execution of S403.

The first task here refers to a task that is reallocated. After entering the idle state, the NC-unit can receive a task scheduling instruction and reapply for processor resource scheduling or restart other processes.

Embodiment of the present disclosure provides a multimode chip. The multimode chip includes a resource allocation circuit and at least two control circuits, where each control circuit supports a communication mode accordingly. For any one of the control circuits, the control circuit is configured to acquire a task scheduling instruction corresponding to a first task, and send to the resource allocation circuit, according to the task scheduling instruction, a processor resource application request corresponding to the first task, where the first task is a task to be executed by the control circuit. After receiving the processor resource application request, the resource allocation circuit is configured to determine, according to the processor resource application request, a processor resource application result corresponding to the first task, and send the processor resource application result to the control circuit, where the processor resource application result indicates a successful application or a failed application. After receiving the processor resource application result, the control circuit processes the first task according to the processor resource application structure. According to the scheme provided in the embodiments of the present disclosure, for a multimode chip supporting multiple communication modes, before execution of a task, a processor resource is applied from the resource allocation circuit firstly, and the task is processed according to an application result, thereby achieving resource scheduling under each control circuit.

Figure 5:
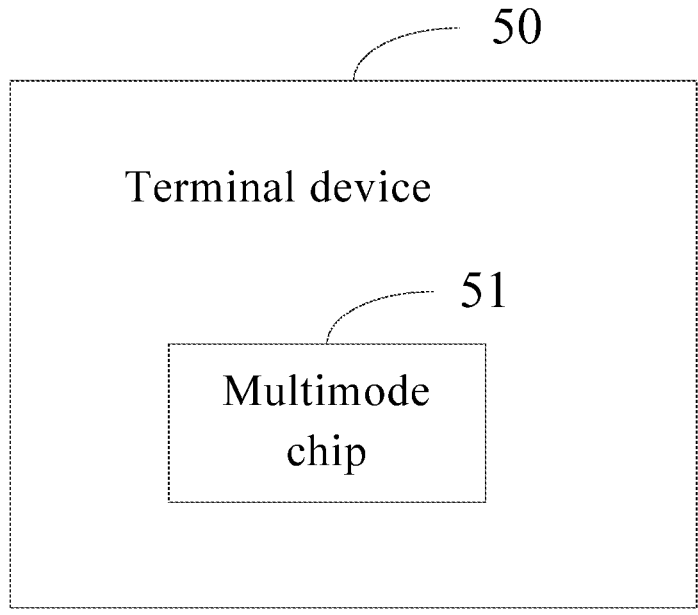
FIG. 5 is a schematic structural diagram of a terminal device according to an embodiment of the present disclosure.

FIG. 5 is a schematic structural diagram of a terminal device according to an embodiment of the present disclosure. As shown in FIG. 5, the terminal device 50 includes a multimode chip 51. The multimode chip 51 includes a resource allocation circuit and at least two control circuits, where each control circuit corresponds to a communication mode. Working principles and modes of the resource allocation circuit and the control circuit are detailed in the above embodiments, which will not be described here again.

In an implementation, the terminal device 50 may further include a transceiver. The transceiver is configured to receive or send a corresponding instruction so that the terminal device 50 can interact with other devices. The transceiver may include a transmitter and/or a receiver. The transmitter may also be termed as a sender, an emitter, a transmitting port, a transmitting interface or other similar description; and the receiver may also be termed as a receiving machine, an acceptor, a receiving port, a receiving interface or other similar description.

In several embodiments provided in the present disclosure, it should be understood that the disclosed system, apparatus, and method may be implemented in other manners. For example, the described apparatus embodiments above are merely exemplary. For example, the division of the units is merely a logical function division and there may be other divisions in actual implementations. For example, multiple units or components may be combined or integrated into another system, or some features may be ignored or not performed. In addition, the mutual couplings or direct couplings or communication connections shown or discussed herein may be implemented through some interfaces. The indirect couplings or communication connections between the apparatuses or units may be implemented in electronic, mechanical, or other forms.

The units illustrated as separate parts may or may not be physically separate, and parts displayed as units may or may not be physical units, that is, they may be located in one position, or may be distributed in multiple network units. Some or all of the units may be selected according to actual needs to achieve the objections of the scheme of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

Persons of ordinary skill in the art may understand that, all or a part of the steps of the foregoing method embodiments may be implemented by hardware related to a program instruction. The foregoing computer program may be stored in a computer-readable storage medium. When the computer program is executed by a processor, the steps of the foregoing method embodiments are implementation. The foregoing storage medium includes various media capable of storing program codes, such as a read only memory (ROM), a random access memory (RAM), a magnetic disk, or an optical disc.

In a first aspect, an embodiment of the present disclosure provides a multimode chip including a resource allocation circuit and at least two control circuits, where each control circuit corresponds to a communication mode; where, the control circuit is configured to acquire a task scheduling instruction corresponding to a first task, and send to the resource allocation circuit, according to the task scheduling instruction, a processor resource application request corresponding to the first task, where the first task is a task to be executed by the control circuit;

the resource allocation circuit is configured to determine, according to the processor resource application request, a processor resource application result corresponding to the first task, and send the processor resource application result to the control circuit, where the processor resource application result indicates a successful application or a failed application; and the control circuit is further configured to process the first task according to the processor resource application result.

In a possible implementation, the control circuit sending to the resource allocation circuit, according to the task scheduling instruction, the processor resource application request corresponding to the first task includes:

determining, according to the task scheduling instruction, a first duration and a start time for executing the first task; and sending the processor resource application request to the resource allocation circuit at a first time, where the processor resource application request includes the first duration, and the first time is earlier than the start time.

In a possible implementation, the control circuit processing the first task according to the processor resource application result includes:

processing the first task according to a processor resource when the processor resource application result indicates a successful application; and acquiring a second duration between a current time and the start time when the processor resource application result indicates a failed application, and processing the first task according to the second duration.

In a possible implementation, the control circuit acquiring the second duration between the current time and the start time, and processing the first task according to the second duration includes:

acquiring the second duration, where the second duration indicates that the current time is earlier than the start time;

resending the processor resource application request to the resource allocation circuit if the second duration is greater than or equal to a preset duration; and otherwise, ending the first task.

In a possible implementation, the control circuit processing the first task according to the processor resource includes:

setting the control circuit to be in a waiting state; and before the start time, acquiring a state of the processor resource, and processing the first task according to the state of the processor resource, where the state of the processor resource is an occupied state or an unoccupied state.

In a possible implementation, the control circuit acquiring the state of the processor resource includes:

sending a query instruction to the resource allocation circuit; and receiving the state of the processor resource from the resource allocation circuit.

In a possible implementation, the control circuit processing the first task according to the state of the processor resource includes:

occupying the processor resource when the state of the processor resource is the unoccupied state, and executing the first task according to the processor resource; and processing the first task according to priority of the first task and priority of a second task when the state of the processor resource is the occupied state, where the second task is a task currently occupying the processor resource.

In a possible implementation, the control circuit processing the first task according to the priority of the first task and the priority of the second task includes:

occupying the processor resource if the priority of the first task is higher than the priority of the second task, and executing the first task according to the processor resource; and acquiring a third duration between the current time and the start time if the priority of the first task is not higher than the priority of the second task, and processing the first task according to the third duration.

In a possible implementation, the control circuit acquiring the third duration between the current time and the start time, and processing the first task according to the third duration includes:

acquiring the third duration, where the third duration indicates that the current time is earlier than the start time;

resending the processor resource application request to the resource allocation circuit if the third duration is greater than or equal to a preset duration; and otherwise, ending the first task.

In a possible implementation, before ending the first task, the control circuit is further configured to send a response signal to the resource allocation circuit, where the response signal is used to indicate unoccupancy of the processor resource by the first task.

In a possible implementation, the at least two control circuits include a narrow band Internet of Things control circuit, and a communication mode corresponding to the narrow band Internet of Things control circuit is a narrow band Internet of Things communication mode.

In a second aspect, an embodiment of the present disclosure provides a terminal device, including the multimode chip according to any one of the first aspect.

Finally, it should be noted that the foregoing embodiments are merely intended for describing the technical solutions of the present disclosure rather than limiting the present disclosure. Although the present disclosure has been described in detail with reference to the foregoing embodiments, persons of ordinary skill in the art should understand that they may still make modifications to the technical solutions described in the foregoing embodiments, or make equivalent replacements to some or all technical features thereof; however, these modifications or replacements do not make the essence of a corresponding technical solution depart from the scope of the technical solutions in the embodiments of the present disclosure.

What is claimed is:

1. A multimode chip, comprising a resource allocation circuit and at least two control circuits, wherein a control circuit corresponds to a communication mode; wherein, the control circuit is configured to acquire a task scheduling instruction corresponding to a first task, and send to the resource allocation circuit, based on the task scheduling instruction, a processor resource application request corresponding to the first task, wherein the first task is a task to be executed by the control circuit;

the resource allocation circuit is configured to determine, based on the processor resource application request, a processor resource application result corresponding to the first task, and send the processor resource application result to the control circuit, wherein the processor resource application result indicates a successful application or a failed application; and the control circuit is further configured to process the first task based on the processor resource application result;

wherein the control circuit sending to the resource allocation circuit, based on the task scheduling instruction, the processor resource application request corresponding to the first task comprises:

determining, based on the task scheduling instruction, a first duration and a start time for executing the first task; and sending the processor resource application request to the resource allocation circuit at a first time, wherein the processor resource application request comprises the first duration, and the first time is earlier than the start time;

wherein the control circuit processing the first task based on the processor resource application result comprises:

processing the first task based on a processor resource in case that the processor resource application result indicates a successful application; and acquiring a second duration between a current time and the start time in case that the processor resource application result indicates a failed application, and processing the first task based on the second duration.

2. The multimode chip according to claim 1, wherein the at least two control circuits comprise a narrow band Internet of Things control circuit, and a communication mode corresponding to the narrow band Internet of Things control circuit is a narrow band Internet of Things communication mode.

3. The multimode chip according to claim 1, wherein the control circuit acquiring the second duration between the current time and the start time, and processing the first task based on the second duration comprises:

acquiring the second duration, wherein the second duration indicates that the current time is earlier than the start time;

resending the processor resource application request to the resource allocation circuit in case that the second duration is greater than or equal to a preset duration; and ending the first task in case that the second duration is less than the preset duration.

4. The multimode chip according to claim 1, wherein the control circuit processing the first task based on the processor resource comprises:

setting the control circuit to be in a waiting state; and before the start time, acquiring a state of the processor resource, and processing the first task based on the state of the processor resource, wherein the state of the processor resource is an occupied state or an unoccupied state.

5. The multimode chip according to claim 4, wherein the control circuit acquiring the state of the processor resource comprises:

sending a query instruction to the resource allocation circuit; and receiving the state of the processor resource from the resource allocation circuit.

6. The multimode chip according to claim 4, wherein the control circuit processing the first task based on the state of the processor resource comprises:

occupying the processor resource in case that the state of the processor resource is the unoccupied state, and executing the first task based on the processor resource; and processing the first task based on priority of the first task and priority of a second task in case that the state of the processor resource is the occupied state, wherein the second task is a task currently occupying the processor resource.

7. The multimode chip according to claim 6, wherein the control circuit processing the first task based on the priority of the first task and the priority of the second task comprises:

occupying the processor resource in case that the priority of the first task is higher than the priority of the second task, and executing the first task based on the processor resource; and acquiring a third duration between the current time and the start time in case that the priority of the first task is not higher than the priority of the second task, and processing the first task based on the third duration.

8. The multimode chip according to claim 7, wherein the control circuit acquiring the third duration between the current time and the start time, and processing the first task based on the third duration comprises:

acquiring the third duration, wherein the third duration indicates that the current time is earlier than the start time;

resending the processor resource application request to the resource allocation circuit in case that the third duration is greater than or equal to a preset duration; and ending the first task in case that the third duration is less than the preset duration.

9. The multimode chip according to claim 8, wherein before ending the first task, the control circuit is further configured to send a response signal to the resource allocation circuit, wherein the response signal is used to indicate unoccupancy of the processor resource by the first task.

10. A terminal device, comprising: a multimode chip, wherein the multimode chip comprises a resource allocation circuit and at least two control circuits, wherein a control circuit corresponds to a communication mode; wherein, the control circuit is configured to acquire a task scheduling instruction corresponding to a first task, and send to the resource allocation circuit, based on the task scheduling instruction, a processor resource application request corresponding to the first task, wherein the first task is a task to be executed by the control circuit;

the resource allocation circuit is configured to determine, based on the processor resource application request, a processor resource application result corresponding to the first task, and send the processor resource application result to the control circuit, wherein the processor resource application result indicates a successful application or a failed application; and the control circuit is further configured to process the first task based on the processor resource application result;

wherein the control circuit sending to the resource allocation circuit, based on the task scheduling instruction, the processor resource application request corresponding to the first task comprises:

determining, based on the task scheduling instruction, a first duration and a start time for executing the first task; and sending the processor resource application request to the resource allocation circuit at a first time, wherein the processor resource application request comprises the first duration, and the first time is earlier than the start time;

wherein the control circuit processing the first task based on the processor resource application result comprises:

processing the first task based on a processor resource in case that the processor resource application result indicates a successful application; and acquiring a second duration between a current time and the start time in case that the processor resource application result indicates a failed application, and processing the first task based on the second duration.

11. The terminal device according to claim 10, wherein the control circuit acquiring the second duration between the current time and the start time, and processing the first task based on the second duration comprises:

acquiring the second duration, wherein the second duration indicates that the current time is earlier than the start time;

resending the processor resource application request to the resource allocation circuit in case that the second duration is greater than or equal to a preset duration; and ending the first task in case that the second duration is less than the preset duration.

12. The terminal device according to claim 10, wherein the control circuit processing the first task based on the processor resource comprises:

setting the control circuit to be in a waiting state; and before the start time, acquiring a state of the processor resource, and processing the first task based on the state of the processor resource, wherein the state of the processor resource is an occupied state or an unoccupied state.

13. The terminal device according to claim 12, wherein the control circuit acquiring the state of the processor resource comprises:

sending a query instruction to the resource allocation circuit; and receiving the state of the processor resource from the resource allocation circuit.

14. The terminal device according to claim 12, wherein the control circuit processing the first task based on the state of the processor resource comprises:

occupying the processor resource in case that the state of the processor resource is the unoccupied state, and executing the first task based on the processor resource; and processing the first task based on priority of the first task and priority of a second task in case that the state of the processor resource is the occupied state, wherein the second task is a task currently occupying the processor resource.

15. The terminal device according to claim 14, wherein the control circuit processing the first task based on the priority of the first task and the priority of the second task comprises:

occupying the processor resource in case that the priority of the first task is higher than the priority of the second task, and executing the first task based on the processor resource; and acquiring a third duration between the current time and the start time in case that the priority of the first task is not higher than the priority of the second task, and processing the first task based on the third duration.

16. The terminal device according to claim 15, wherein the control circuit acquiring the third duration between the current time and the start time, and processing the first task based on the third duration comprises:

acquiring the third duration, wherein the third duration indicates that the current time is earlier than the start time;

resending the processor resource application request to the resource allocation circuit in case that the third duration is greater than or equal to a preset duration; and ending the first task in case that the third duration is less than the preset duration.

* * * * *